United States Patent
Yoo et al.

(10) Patent No.: US 11,659,812 B2
(45) Date of Patent: May 30, 2023

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 833 days.

(21) Appl. No.: 16/571,245

(22) Filed: Sep. 16, 2019

(65) Prior Publication Data

US 2020/0091769 A1    Mar. 19, 2020

Related U.S. Application Data

(60) Provisional application No. 62/733,393, filed on Sep. 19, 2018.

(30) Foreign Application Priority Data

Nov. 1, 2018    (KR) .................. 10-2018-0133061

(51) Int. Cl.
*H02J 50/10*    (2016.01)
*B01D 35/027*    (2006.01)
(Continued)

(52) U.S. Cl.
CPC .............. *H02J 50/10* (2016.02); *A01K 7/005* (2013.01); *A01K 7/025* (2013.01); *B01D 35/027* (2013.01); *H02J 7/025* (2013.01)

(58) Field of Classification Search
CPC .......... H02J 50/10; H02J 50/00; H02J 50/001; H02J 50/005; H02J 50/05; H02J 50/12;
(Continued)

(56) References Cited

U.S. PATENT DOCUMENTS 1,218,969 A    3/1917 Ziener
1,512,629 A    10/1924 Mueller et al.
(Continued)

FOREIGN PATENT DOCUMENTS

CA    2082083    5/1994
CA    2587229    5/2006
(Continued)

OTHER PUBLICATIONS

English Translation of CH 711714 B1 (Year: 2022).*
(Continued)

*Primary Examiner* — M Baye Diao
(74) *Attorney, Agent, or Firm* — Ked & Associates, LLP

(57) ABSTRACT

A pet water dispenser may include a water tank having an upper opening, a pump, a water supply pipe connected to the pump to transfer water, and a water supply hole formed in a water supply plate communicating with the water supply pipe. A removable inner assembly may include the pump, the water supply pipe, and the water supply plate, and may further include a wireless power receiver to receive power from a wireless power transmitter, which may include a plurality of partially overlapping coils.

19 Claims, 9 Drawing Sheets

(51) Int. Cl.
  *H02J 7/02* (2016.01)
  *A01K 7/02* (2006.01)
  *A01K 7/00* (2006.01)

(58) Field of Classification Search
  CPC .. H02J 50/15; H02J 50/20; H02J 50/23; H02J 50/27; H02J 50/30; H02J 50/40; H02J 50/402; H02J 50/50; H02J 50/502; H02J 50/60; H02J 50/70; H02J 50/80; H02J 50/90; H02J 7/00; H02J 7/0042; H02J 7/0044; H02J 7/0045; A01K 7/005; A01K 7/025; A01K 7/022; A01K 7/02; A01K 39/02; A01K 39/022; B01D 35/027; C02F 1/00; C02F 1/32
  USPC .................................................... 320/108
  See application file for complete search history.

(56) References Cited

U.S. PATENT DOCUMENTS

| | | | |
|---|---|---|---|
| 2,103,653 | A | 12/1937 | Weil |
| 2,510,446 | A | 6/1950 | Weil |
| 3,076,435 | A | 2/1963 | Seymour |
| 3,303,824 | A | 2/1967 | Anderson |
| 3,441,003 | A | 4/1969 | Du Mond et al. |
| D221,755 | S | 9/1971 | Johnson |
| 3,691,787 | A | 9/1972 | Kaufmann |
| 3,765,614 | A | 10/1973 | Bartl et al. |
| 4,100,885 | A | 7/1978 | Kapplinger |
| 4,133,456 | A | 1/1979 | Corini |
| 4,286,546 | A | 9/1981 | Moore |
| 4,561,384 | A | 12/1985 | Liff |
| 4,640,226 | A | 2/1987 | Liff |
| 4,932,561 | A | 6/1990 | Boxall |
| 5,031,689 | A | 7/1991 | Jones et al. |
| 5,105,771 | A | 4/1992 | Schafer |
| 5,140,134 | A | 8/1992 | Reusche et al. |
| 5,174,245 | A | 12/1992 | Bishop |
| 5,205,242 | A | 4/1993 | Kasselman |
| 5,209,069 | A | 5/1993 | Newnan |
| 5,345,063 | A | 9/1994 | Reusche et al. |
| 5,601,199 | A | 2/1997 | Marty |
| 5,699,669 | A | 12/1997 | Gebhard |
| 5,791,287 | A | 8/1998 | Gruber |
| 5,799,609 | A | 9/1998 | Burns et al. |
| 5,845,605 | A | 12/1998 | Malamphy |
| 5,884,582 | A | 3/1999 | Duckworth |
| 6,230,653 | B1 | 5/2001 | Tobin |
| 6,460,483 | B1 | 10/2002 | Northrop et al. |
| 6,622,657 | B2 | 9/2003 | Northrop et al. |
| 6,705,540 | B2 | 3/2004 | Koshiyama et al. |
| 6,848,392 | B1 | 2/2005 | Kreutzer, Jr. |
| 7,089,881 | B2 | 8/2006 | Plante |
| 7,270,082 | B2 * | 9/2007 | Plante ............. A01K 7/022 119/74 |
| 7,549,395 | B2 | 6/2009 | Stenberg |
| 7,600,486 | B2 | 10/2009 | Ellis |
| 7,743,698 | B2 | 6/2010 | Muir et al. |
| 7,823,538 | B1 | 11/2010 | Merager |
| 7,958,844 | B1 | 6/2011 | Northrop |
| 8,117,991 | B1 | 2/2012 | Civitillo |
| 8,210,447 | B2 | 7/2012 | Cohen |
| 8,387,566 | B2 | 3/2013 | Graves et al. |
| 8,770,147 | B2 | 7/2014 | Rowe |
| 8,770,148 | B2 * | 7/2014 | Lipscomb ............. F04B 23/021 119/74 |
| 9,035,222 | B2 * | 5/2015 | Alexander ............ A47J 39/025 165/61 |
| D738,579 | S | 9/2015 | Owens et al. |
| D755,449 | S | 5/2016 | Cornwell, Jr. et al. |
| 9,497,930 | B2 | 11/2016 | Jubinville et al. |
| 1,243,126 | A1 | 10/2017 | Ziener |
| D819,898 | S | 6/2018 | Poisson et al. |
| 10,165,753 | B1 | 1/2019 | Huang |
| 11,154,034 | B2 | 10/2021 | Youn et al. |
| 11,160,250 | B2 | 11/2021 | Yoo et al. |
| 2002/0020673 | A1 | 2/2002 | Nohren et al. |
| 2003/0115902 | A1 | 6/2003 | Busick et al. |
| 2003/0140864 | A1 | 7/2003 | Wenstrand |
| 2003/0213437 | A1 | 11/2003 | Norris |
| 2005/0166853 | A1 | 8/2005 | Plante |
| 2006/0174838 | A1 | 8/2006 | Plante |
| 2006/0231040 | A1 | 10/2006 | Bast et al. |
| 2006/0288947 | A1 | 12/2006 | Perlsweig et al. |
| 2007/0045159 | A1 | 3/2007 | Lee |
| 2007/0095297 | A1 | 5/2007 | Boyd |
| 2007/0199512 | A1 | 8/2007 | Ellis |
| 2007/0227456 | A1 | 10/2007 | Borey |
| 2008/0078330 | A1 | 4/2008 | McCallum et al. |
| 2008/0169249 | A1 | 7/2008 | Ter Stege |
| 2008/0190374 | A1 | 8/2008 | Farris |
| 2008/0257272 | A1 | 10/2008 | Bolda |
| 2009/0126641 | A1 | 5/2009 | Anderson et al. |
| 2009/0218985 | A1 | 9/2009 | Hallett |
| 2010/0095897 | A1 | 4/2010 | Rowe |
| 2010/0276508 | A1 | 11/2010 | Davies |
| 2010/0300366 | A1 | 12/2010 | Lipscomb et al. |
| 2011/0067638 | A1 | 3/2011 | Lipscomb et al. |
| 2011/0102945 | A1 | 5/2011 | Isono et al. |
| 2011/0214613 | A1 | 9/2011 | Diamond |
| 2011/0226470 | A1 * | 9/2011 | Latrille ............. E21B 47/13 307/104 |
| 2011/0259273 | A1 | 10/2011 | Lipscomb et al. |
| 2012/0017839 | A1 | 1/2012 | Veness et al. |
| 2012/0111280 | A1 | 5/2012 | Shin et al. |
| 2012/0216751 | A1 | 8/2012 | Rowe |
| 2013/0087102 | A1 | 4/2013 | Lipscomb et al. |
| 2013/0092090 | A1 | 4/2013 | McCallum |
| 2013/0175802 | A1 | 7/2013 | Breau et al. |
| 2013/0192529 | A1 | 8/2013 | Kruger et al. |
| 2013/0200064 | A1 | 8/2013 | Alexander |
| 2013/0228132 | A1 | 9/2013 | Lipscomb et al. |
| 2013/0255280 | A1 | 10/2013 | Murphy et al. |
| 2014/0033984 | A1 | 2/2014 | Li et al. |
| 2014/0053781 | A1 | 2/2014 | Lewis |
| 2014/0076242 | A1 | 3/2014 | Ho |
| 2014/0165607 | A1 * | 6/2014 | Alexander .......... A47J 27/2105 62/3.3 |
| 2014/0251223 | A1 | 9/2014 | Rowe et al. |
| 2014/0353335 | A1 | 12/2014 | Van Diepen |
| 2015/0135728 | A1 | 5/2015 | Swanson et al. |
| 2015/0189862 | A1 | 7/2015 | Lipscomb et al. |
| 2015/0196157 | A1 | 7/2015 | Swisth |
| 2015/0276204 | A1 | 10/2015 | Ray |
| 2015/0313180 | A1 | 11/2015 | Lipscomb et al. |
| 2015/0353335 | A1 | 12/2015 | Breault |
| 2016/0000037 | A1 | 1/2016 | Lipscomb et al. |
| 2016/0099599 | A1 | 4/2016 | Ho et al. |
| 2016/0113249 | A1 | 4/2016 | Kuo |
| 2016/0118179 | A1 | 4/2016 | Park et al. |
| 2016/0159633 | A1 | 6/2016 | Diffenderfer |
| 2016/0286757 | A1 | 10/2016 | Armstrong |
| 2016/0287363 | A1 | 10/2016 | Miller |
| 2017/0245465 | A1 | 8/2017 | Oates et al. |
| 2017/0255186 | A1 | 9/2017 | Ryznar et al. |
| 2018/0054073 | A1 | 2/2018 | Olson et al. |
| 2018/0160648 | A1 | 6/2018 | Goh |
| 2018/0177325 | A1 | 6/2018 | Lyons et al. |
| 2019/0075755 | A1 | 3/2019 | Imaizumi et al. |
| 2019/0140471 | A1 | 5/2019 | Johanski et al. |
| 2019/0162460 | A1 | 5/2019 | Oh |
| 2019/0227580 | A1 | 7/2019 | von der Assen et al. |
| 2019/0239476 | A1 | 8/2019 | Mai et al. |
| 2019/0239491 | A1 | 8/2019 | Yu et al. |
| 2019/0357747 | A1 | 11/2019 | Keiler, III |
| 2020/0303971 | A1 * | 9/2020 | Hall ................ H02J 50/20 |
| 2020/0337266 | A1 | 10/2020 | Yu et al. |
| 2020/0355751 | A1 * | 11/2020 | Swaans ............. H02J 50/80 |

FOREIGN PATENT DOCUMENTS

| | | | |
|---|---|---|---|
| CH | 711714 B1 * | 1/2022 | ............ H02J 50/10 |
| CN | 2322412 | 6/1999 | |

(56) References Cited

FOREIGN PATENT DOCUMENTS

| | | |
|---|---|---|
| CN | 2351955 | 12/1999 |
| CN | 1701206 | 11/2005 |
| CN | 2776044 | 5/2006 |
| CN | 1870903 | 11/2006 |
| CN | 200994393 | 12/2007 |
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102934044 | 2/2013 |
| CN | 202722224 | 2/2013 |
| CN | 202873523 | 4/2013 |
| CN | 203136752 | 8/2013 |
| CN | 203544552 | 4/2014 |
| CN | 203618522 | 6/2014 |
| CN | 103917147 | 7/2014 |
| CN | 103931515 | 7/2014 |
| CN | 203913286 | 11/2014 |
| CN | 204707695 | 10/2015 |
| CN | 204722018 | 10/2015 |
| CN | 105265331 | 1/2016 |
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 A * | 5/2017 ............ H02J 50/10 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 109513315 | 3/2019 |
| CN | 109997713 | 7/2019 |
| DE | 20 2016 107 252 | 3/2018 |
| EP | 0 894 430 | 2/1999 |
| EP | 1 188 995 | 3/2002 |
| EP | 1 566 099 | 8/2005 |
| EP | 3 315 022 | 5/2018 |
| EP | 3 520 607 | 8/2019 |
| FR | 2 726 452 | 5/1996 |
| GB | 2 458 173 | 9/2009 |
| GB | 2574921 A * | 12/2019 ............ B05B 17/08 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-0835557 | 6/2008 |
| KR | 10-2010-0046615 | 5/2010 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |
| KR | 10-1825334 | 2/2018 |
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

U.S. Appl. No. 16/574,259, filed Sep. 18, 2019.
U.S. Appl. No. 16/574,418, filed Sep. 18, 2019.
U.S. Appl. No. 16/571,090, filed Sep. 14, 2019.
U.S. Appl. No. 16/569,841, filed Sep. 13, 2019.
Chinese Notice of Allowance dated Apr. 8, 2022 issued in CN Application No. 201910888611.7.
United States Office Action dated May 19, 2022 issued in co-pending related U.S. Appl. No. 16/569,827.
United States Office Action dated Jun. 1, 2022 issued in co-pending related U.S. Appl. No. 16/571,075.
United States Office Action dated Jun. 2, 2022 issued in co-pending related U.S. Appl. No. 16/570,279.
United States Office Action dated Jun. 15, 2022 issued in co-pending related U.S. Appl. No. 16/569,908.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
European Search Report dated Apr. 9, 2020 issued in EP Application No. 19198174.5.
United States Office Action dated Jun. 2, 2020 issued in co-pending related U.S. Appl. No. 16/574,259.
Chinese Office Action dated May 10, 2021 issued in CN Application No. 201910888718.1.
European Search Report dated Feb. 24, 2020 issued in EP Application No. 19198289.1.
Chinese Office Action dated Mar. 31, 2021 issued in CN Application No. 201910886533.7.
Chinese Office Action dated Nov. 10, 2021 issued in CN Application No. 201910886533.7.
Chinese Office Action dated Nov. 10, 2021 issued in CN Application No. 201910886714.X.
United States Office Action dated Feb. 11, 2022 issued in co-pending related U.S. Appl. No. 16/574,322.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.

(56) References Cited

OTHER PUBLICATIONS

European Search Report dated Apr. 20, 2020 issued in EP Application No. 19198368.3.
Dong, CN108464253A Machine Translation Description, Aug. 31, 2018, obtained Jan. 13, 2022 (Year: 2018).
United States Office Action dated Mar. 14, 2022 issued in co-pending related U.S. Appl. No. 16/570,310.
United States Office Action dated Mar. 17, 2022 issued in co-pending related U.S. Appl. No. 16/574,581.
United States Office Action dated Jul. 29, 2022 issued in co-pending related U.S. Appl. No. 16/574,322.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
United States Office Action dated Oct. 5, 2021 issued in co-pending related U.S. Appl. No. 16/571,074.
Chinese Office Action dated May 17, 2021 issued in CN Application No. 201910889361.9.
European Search Report dated Feb. 27, 2020 issued in Application No. 19198292.5.
European Search Report dated Feb. 27, 2020 issued in Application No. 19198298.2.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
Chinese Office Action dated May 21, 2021 issued in CN Application No. 201910888661.5.
United States Office Action dated May 11, 2021 issued in co-pending related U.S. Appl. No. 16/571,093.
United States Office Action dated Mar. 24, 2022 issued in co-pending related U.S. Appl. No. 16/571,089.
United States Office Action dated Jun. 23, 2022 issued in co-pending related U.S. Appl. No. 16/574,368.
United States Office Action dated Jul. 5, 2022 issued in co-pending related U.S. Appl. No. 16/574,240.
United States Office Action dated Jul. 7, 2022 issued in co-pending related U.S. Appl. No. 16/574,474.
Chinese Office Action dated Mar. 30, 2021 issued in CN Application No. 201910886714.X.
United States Office Action dated Dec. 6, 2021 issued in co-pending related U.S. Appl. No. 16/569,827.
United States Office Action dated Dec. 10, 2021 issued in co-pending related U.S. Appl. No. 16/571,075.
United States Office Action dated Mar. 30, 2021 issued in co-pending related U.S. Appl. No. 16/571,090.
United States Office Action dated Feb. 1, 2022 issued in co-pending related U.S. Appl. No. 16/574,237.
European Search Report dated Feb. 3, 2020 issued in EP Application No. 19198170.3.
Chinese Office Action dated Apr. 1, 2021 issued in CN Application No. 201910886305.X.
Chinese Office Action dated Apr. 9, 2021 issued in CN Application No. 201910886526.7.
European Search Report dated Apr. 23, 2020 issued in EP Application No. 19198303.0.
Chinese Notice of Allowance dated Jul. 11, 2022 issued in CN Application No. 201910886305.X.
United States Office Action dated Sep. 19, 2022 issued in co-pending related U.S. Appl. No. 16/569,827.
United States Office Action dated Oct. 11, 2022 issued in co-pending related U.S. Appl. No. 16/570,279.
United States Office Action dated Oct. 13, 2022 issued in co-pending related U.S. Appl. No. 16/571,089.
Chinese Notice of Allowance dated Aug. 31, 2022 issued in CN Application No. 201910889318.2.
Chinese Office Action dated Sep. 21, 2022 issued in CN Application No. 201910888224.3.
U.S. Appl. No. 16/574,219, filed Sep. 18, 2019.
U.S. Appl. No. 16/574,240, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,093, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
U.S. Appl. No. 16/569,908, filed Sep. 13, 2019.
U.S. Appl. No. 16/574,219 dated Sep. 18, 2019.
U.S. Appl. No. 16/574,237, dated Sep. 18, 2019.
U.S. Appl. No. 16/574,322, dated Sep. 18, 2019.
U.S. Appl. No. 16/574,368, dated Sep. 18, 2019.
U.S. Appl. No. 16/574,474, dated Sep. 18, 2019.
U.S. Appl. No. 16/574,581, dated Sep. 18, 2019.
U.S. Appl. No. 16/571,245, dated Sep. 16, 2019.
U.S. Appl. No. 16/571,093, dated Sep. 14, 2019.
U.S. Appl. No. 16/571,089, dated Sep. 14, 2019.
U.S. Appl. No. 16/571,076, dated Sep. 14, 2019.
U.S. Appl. No. 16/571,074, dated Sep. 14, 2019.
U.S. Appl. No. 16/570,279, dated Sep. 13, 2019.

(56) References Cited

OTHER PUBLICATIONS

U.S. Appl. No. 16/569,827, dated Sep. 13, 2019.
United States Office Action dated Mar. 3, 2023 issued in co-pending related U.S. Appl. No. 16/574,474.
United States Office Action dated Feb. 23, 2023 issued in co-pending related U.S. Appl. No. 16/574,322.
Rao et al. (2015). Effect of Corrugation Angle on Heat Transfer Studies of Viscous Fluids in Corrugated Plate Heat Exchangers. International Journal of Engineering and Technology Innovation, 5(2), pp. 99-107. (Year: 2015).

\* cited by examiner

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018, and Korean Application No. 10-2018-0133061 filed on Nov. 1, 2018, whose entire disclosure(s) is/are hereby incorporated by reference.

BACKGROUND

1. Field

A liquid dispenser to supply liquid to an animal, e.g., a pet, is disclosed herein.

2. Background

Power transmission is required to operate pumps of water dispensers, and such power transmission usually involves a terminal system that connects physical cables or wires to an external or commercial power source. Cables or electric wires may occupy a considerable amount of space, are not easy to arrange, and are at risk of disconnection. To solve such an issue, wireless power transmission (WPT) methods are currently being developed.

US 2015/0313180 and US 2012/0216751 (hereinafter referred to as "related art") disclose drinking bowls for pets. However, such drinking bowls have various disadvantages, which the present disclosure solves.

The above references are incorporated by reference herein where appropriate for appropriate teachings of additional or alternative details, features and/or technical background.

DETAILED DESCRIPTION OF THE INVENTION

Figure 1:
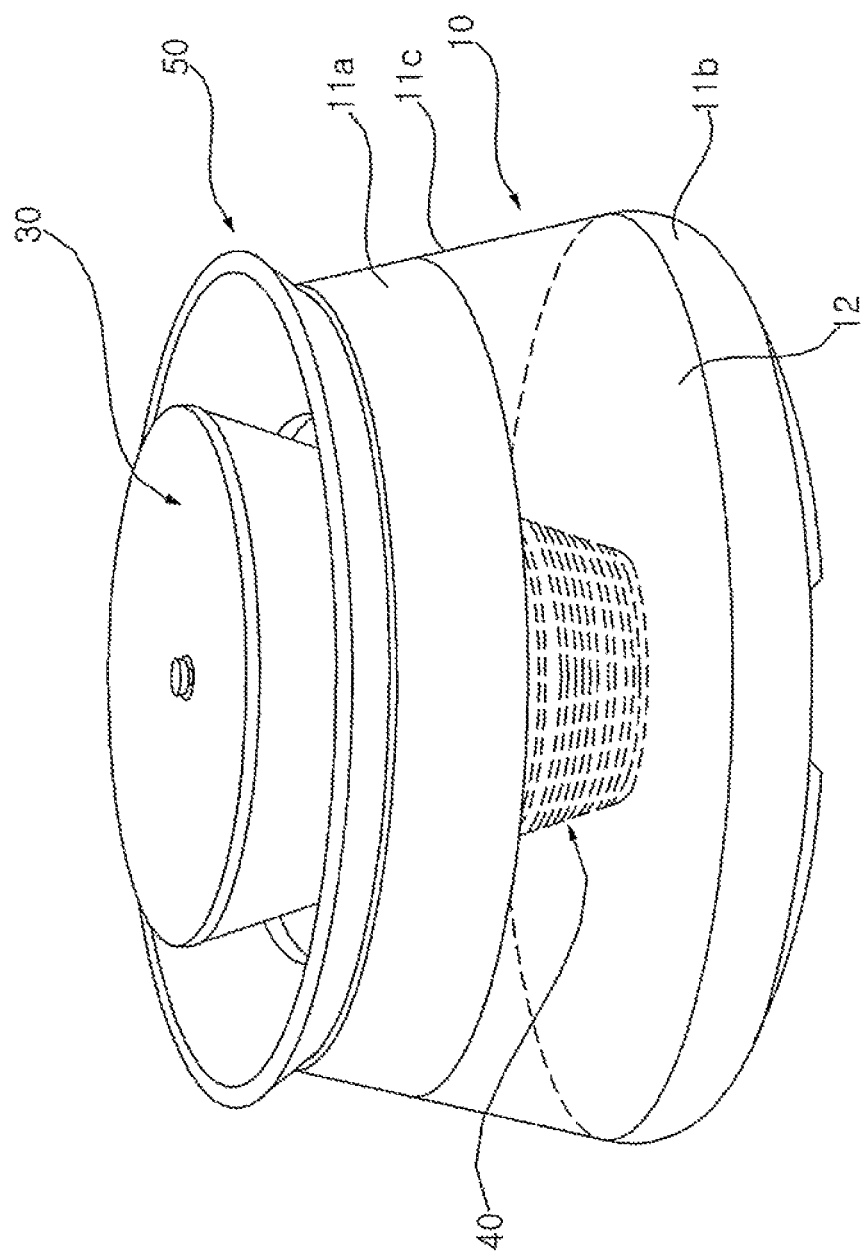
FIG. 1 is a perspective view showing an appearance of a pet water dispenser according to an embodiment.
Figure 2:
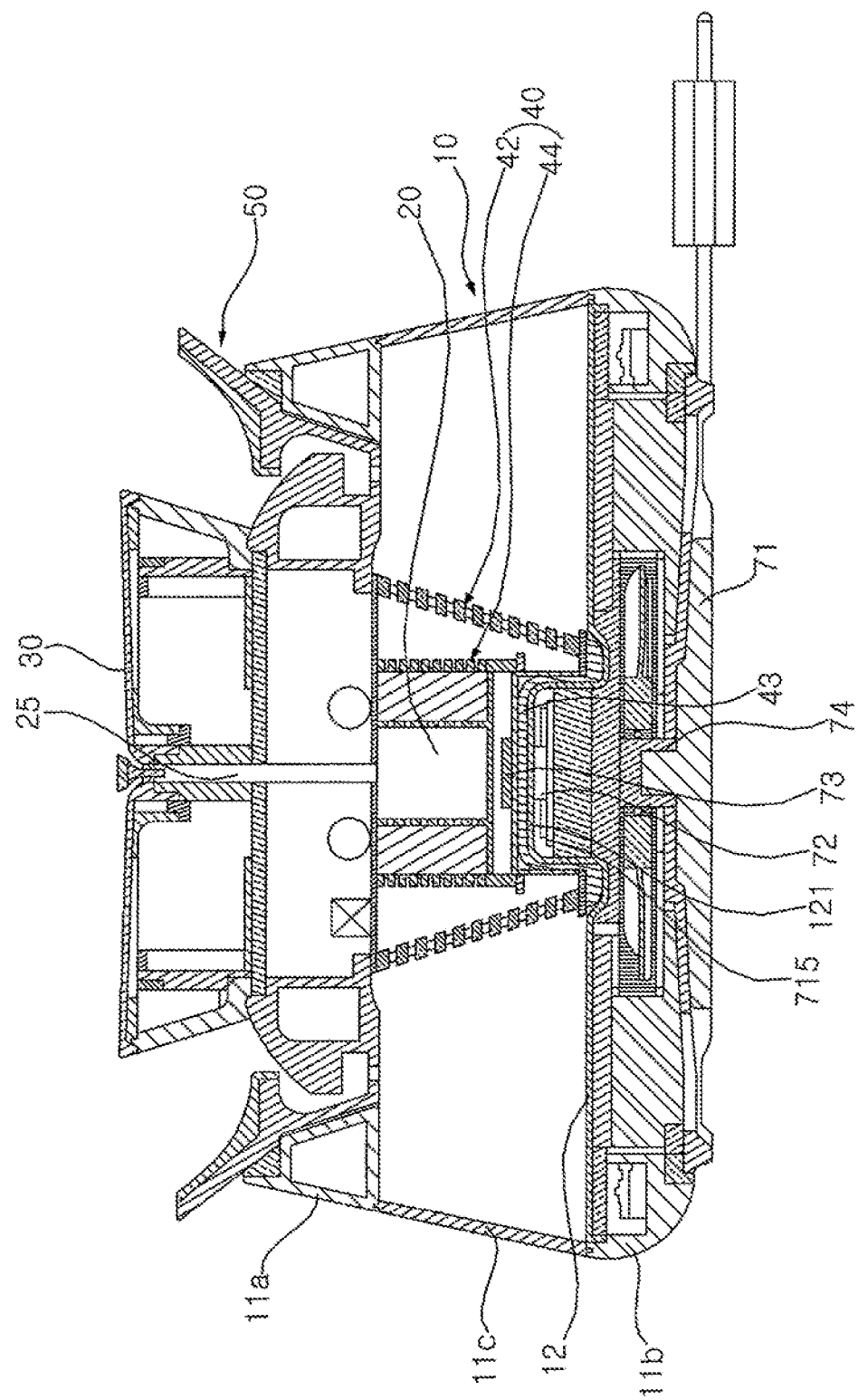
FIG. 2 is a sectional view of the pet water dispenser shown in FIG. 1.

Referring to FIGS. 1-2, a liquid dispenser (e.g., a pet water dispenser) may include a water tank or a water storage chamber 10, a water supply plate or an upper plate 30, a pump provided in the water tank 10, and a water guide or a water receiver 50 provided under the water supply plate 30 to catch failing water, thereby providing a circulation system in which water supplied to the water supply plate 30 is circulated back to the water tank 10.

In a conventional pet water dispenser, a pump is provided inside the water tank and a wire is directly connected to the pump and extended to an outside of the dispenser. The pump may be part of a member fixed in the dispenser, such that cleaning and maintenance of the dispenser and the other components may be inconvenient and require dismantling of the entire dispenser.

Accordingly, the present disclosure may include a removable inner assembly 100 (FIG. 3) that includes the pump 20. The inner assembly 100 may be detachably attached to the water tank 10, and power may be delivered to the inner assembly 100 via a wireless power transfer method. Since electric power may be wirelessly transmitted to the pump 20 of the inner assembly 100, the water tank 10 and the inner assembly 100 may be easily separated without any dismantling or rewiring. Therefore, maintenance and cleaning of the dispenser may be made easier.

In the present disclosure, the wireless power transfer method may operate using first and second wireless power transfer devices 72 and 73 (e.g., transceivers or a transmitter and a receiver). Each of the first and second wireless power transfer devices 72 and 73 may use or select different combinations of coils resulting in different power ranges or usages when transmitting and/or receiving power according to a power situation, maximizing power transmission efficiency.

The first and second wireless power transfer devices 72 and 73 may each include a plurality of coils that are partially overlapped to maintain stable wireless power transmission even if positions of the first and second wireless power transfer devices 72 and 73 change. Such a coil structure will be described later with reference to FIGS. 7-8.

Referring to FIGS. 1 and 2, a water circulation structure will be described. The water tank 10 may be configured to store water, and the pump 20 may suction or pressure feed water stored in the water tank 10. Water discharged from the pump 20 may be transferred to the water supply plate 30 via a water supply pipe 25, and may flow or cascade over the water supply plate 30.

The water guide 50 may be provided between the water tank 10 and the water supply plate 30 to receive or catch the water dropped from the water supply plate 30, and the water guide 50 may guide the dropped water back to the water tank 10. The water guide 50 may also be referred to as a splash guard or drip tray.

A filter assembly 40 may be provided in the water tank 10 to filter foreign substances contained in the water before the water stored in the water tank 10 flows into the pump 20. The pet water dispenser may also include an illumination assembly having a lighting device, a water level sensor, a water temperature sensor, a proximity sensor, a contamination level sensor, a thermoelectric element or device, and a sterilizing filter (e.g., ultraviolet light emitting diode). The illumination assembly may support the water supply plate 30 above the water guide 50 and water tank 10. Details of such sensors and devices may be found in U.S. application Ser. No. 16/659,841, filed on Sep. 13, 2019, the entire contents of which is incorporated by reference herein.

A power supply assembly to supply power to the pump 20 may include a docking station 71 provided under the water tank 10. The docking station 71 may electrically connect to the first wireless power transfer device 72, which may be a transceiver or a wireless power transmitter. A second wireless power transfer device 72, which may be a transceiver or a wireless power receiver, may be provided in the inner assembly 100 that is placed in and detached from the water tank 10. The first wireless power transfer device 72 may transmit power to and/or receive power from the second wireless power transfer device 73.

The docking station 71 may be configured to be separate from the water tank 10, and may be configured to receive external power applied through an electrical socket of the docking station 71. As the docking station 71 and the water tank 10 may be detachably coupled, and external electric power may be transmitted to the water tank 10 when the water tank 10 is seated on and/or electrically connected to the docking station 71.

The water tank 10 may include a container in which water or liquid is stored. The container of the water tank 10 may include an upper opening, while a bottom end of the container of the water tank 10 may be closed or covered by a bottom plate 12. The container of the water tank 10 may be formed with upper walls 11*a* and main wall 11*c*, and the container may be provided on a base of the container defined by a container support 11*b*. A lower end of the upper wall 11*a* may be coupled to an upper end of the main wall 11*c*, and a lower end of the main wall 11*c* may be coupled to the container support 11*b* and/or the bottom plate 12. The container support 11*b* may also be referred to as a lower wall. The bottom plate 12 may be provided between the main wall 11*c* and the container support 11*b*, and may define a bottom of the container of the water tank 10 and a top of the base of the water tank 10.

The container of the water tank 10 may be formed in a truncated cone shape having a diameter that decreases from a lower end to an upper end. Inclinations of the main wall 11*c* and the upper wall 11*a* may be substantially the same or similar so as to give a seamless inclination. However, embodiments disclosed herein are not limited to a truncated cone shaped container of the water tank 10. For example, the upper wall 11*a* may be inclined outward from an upper end of the main wall 11*a*. As another example, the container of the water tank 10 may be cylindrical, and the upper and main walls 11*a* and 11*c* may be straight or vertical.

While the bottom plate 12 may define the top of the base of the water tank 10, a base plate 18 may define a bottom of the base of the water tank 10 and close or cover a lower opening of the container support 11*b*. The base plate 18 may be provided on a lower end of the container support 11*b* of the water tank 10 so as to be spaced apart from and provided below the bottom plate 12. The docking station 71 may be provided below and coupled to the base plate 18. A bottom surface of the base plate 18 may be configured to correspond to a shape or contour of an upper surface of the docking station 71.

An inner space of the base of the water tank 10 may be formed by the container support 11*b* at sides, the bottom plate 12 on top, and the base plate 18 on bottom. Electronic devices (e.g., a thermoelectric element, a fan, a heat sink, a temperature sensor, a weight sensor or water level sensor, a proximity sensor, a gyro sensor) may be provided in the inner space of the base of the water tank 10.

The base plate 18 may include a connection device or terminal 74 which connects to a terminal of the docking station 71, so external power applied to the docking station 71 may easily be transmitted to the base plate 18 and the electronic devices provided in the base of the water tank 10. The connection terminal 74 may be configured to transmit and receive electric power to and from the connection terminal of the docking station 71 by being physically connected via electrodes. Details of the connection terminal 74 of the base plate 18 and the connection terminal of the docking station 71 are provided in U.S. application Ser. No. 16/571,089 filed on Sep. 14, 2019, the entire contents of which is incorporated by reference herein.

When the connection terminal of the docking station 71 is coupled to the connection terminal 74 of the base plate 18, the first wireless power transfer device 72 provided above the base plate 18 in the base of the water tank 10 may receive electric power, and wirelessly transmit the power via, e.g., an electromagnetic induction method, to the second wireless power transfer device 73 provided in the inner assembly 100. The second wireless power transfer device 73 may use received power to power the pump 20 and other electronic devices, such as a controller C and a battery B. Details of a wireless power transmission method, a powering of the electronic devices in the base of the water tank 10, and a powering of the electronic devices in the inner assembly 100 of the water tank 10 are provided in U.S. application Ser. No. 16/571,075 filed on Sep. 14, 2019, the entire contents of which are incorporated by reference herein.

Figure 3:
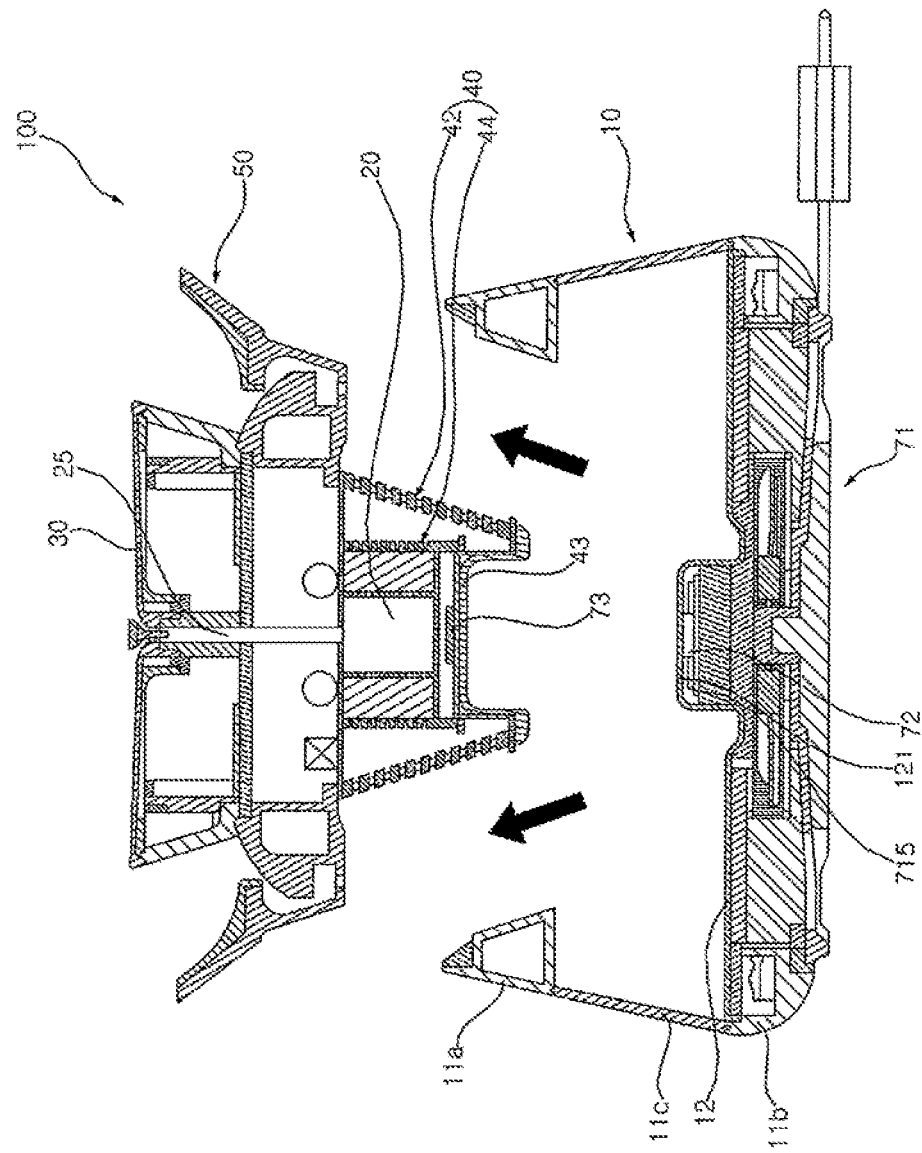
FIG. 3 is a cross-sectional view showing a combination of a water tank and an inner assembly.

Referring to FIGS. 1-3, the inner assembly 100 may include the filter assembly 40, the pump 20, and the second wireless power transfer device 73. The inner assembly may further include the water guide 50, the water supply pipe 25, and the water supply plate 30. The water supply plate 30 may be configured to be removable from the inner assembly 100. The water supply plate 30 may be lifted up and removed to be cleaned, repaired, or swapped with another water supply plate 30 having a different height, shape, angle of inclination, material, etc.

The entire inner assembly 100 may be lifted from the water tank 10 by lifting the water guide 50 from the upper wall 11*a* of the water tank 10, and may be inserted into the water tank 10 by placing the water guide 50 on the upper wall 11*a*, and also by inserting the filter 40 onto a protrusion 121 of the bottom plate 12 described later. Details of the water guide 50 and a coupling of the inner assembly 100 to the water tank 10 are found in U.S. application Ser. No. 16/571,074 filed on Sep. 14, 2019 and U.S. application Ser. No. 16/571,073 filed on Sep. 14, 2019.

As an alternative, the inner assembly 100 may not be removable from the water tank 10 and may instead be bonded to the water tank 10. However, the inner assembly 100 of the present disclosure may be easily lifted from the water tank 10 to facility easy cleaning and maintenance of both the water tank 10 and the inner assembly 100.

A lower surface of the inner assembly 100 may be configured to couple to an upper surface of the bottom plate 12, and may include a shape or contour that corresponds to a shape or contour of the upper surface of the bottom plate 12. The lower surface of the inner assembly 100 and the upper surface of the bottom plate 12 may be configured to facilitate a stable coupling.

Figure 4:
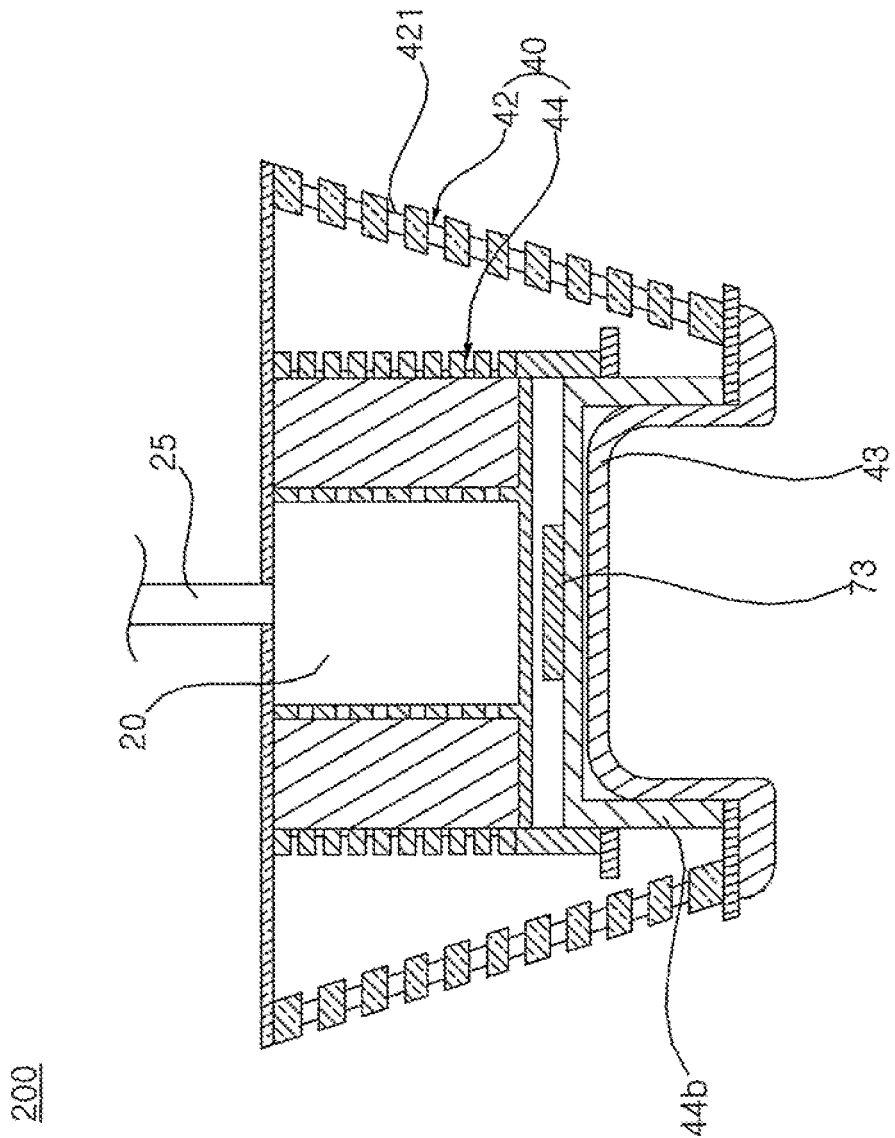
FIG. 4 is a cross-sectional view of the assembled inner assembly.

Referring to FIGS. 3-4, the bottom plate 12 may include a protrusion 121 on which a lower filter cover 43 of the inner assembly 100 may be inserted. An outer contour of the protrusion 121 may correspond to an inner contour of the lower filter cover 43. Although cylindrical shapes are shown, embodiments disclosed herein are not limited hereto. As an example, the protrusion 121 may include threads corresponding to threads of the lower filter cover 43.

The lower filter cover 43 may have an upward convex curvature so as to fit onto the protrusion 121 of the bottom plate 12, which may be cylindrical. The bottom plate 12 may also be formed with a groove or recess 122 formed around the protrusion 121, and a lower end of the lower filter cover 43 may be configured to fit inside the groove 122. The protrusion 121 and the groove 122 may maintain a stable position of the inner assembly 100 when the inner assembly 100 is seated on and inserted into the water tank 10.

The lower filter cover 43 may be provided on a lower end of the filter assembly 40. The filter assembly 40 may include a first filter 42 and a second filter 44. The first filter 42 may be a conical strainer formed in a truncated cone shape. The first filter may be made of a rigid material (e.g., metal or rigid plastic) and may include a plurality of through holes 421 formed on a sidewall. However, a shape of the first filter 42 is not limited to those shown in the above description and drawings. For example, the first filter 42 may alternatively be cylindrical.

The second filter 44 may be provided in inside of the first filter 42, and the pump 20 may be installed or located in an inner space of the second filter 44. The second filter 44 may have a cylindrical shape, but shapes of the second filter 44 are not limited thereto and alternatively the second filter 44 may have a truncated cone shape. Like the first filter 42, the second filter 44 may be a strainer made of a rigid material (e.g., metal or rigid plastic).

The second filter 44 may have first and second walls spaced apart from each other, and a filter medium 45 (e.g., carbon filter, mesh filter) may be provided between the two walls to facilitate additional filtering. Each of the first and second (or outer and inner, respectively) walls may include a plurality of through holes. The pump 20 may be provided within the second wall of the second filter 44 such that liquid may flow through the through holes 421 of the first filter 42, the through holes of the first wall of the second filter 44, the filter medium 45, the through holes of the second wall of the second filter 44, and into an inlet of the pump 20.

A support cylinder 44b may be provided between the second filter 44 and the lower filter cover 43. The support cylinder 44b may be convex upward to engage with and cover the lower filter cover 43. The support cylinder 44b may be pressed-fit onto the lower filter cover 43, which may be seated on the protrusion 121.

A support plate 44a may divide the lower section of the second filter 44 from an upper section. An outer contour or surface of the support cylinder 44b may correspond to an inner contour or surface of a lower section of the second filter 44, and the support cylinder 44b may be pressed-fit into the lower section of the second filter 44. As an alternative example, the lower section of the second filter 44 may include threads with which threads of an outer contour of the support cylinder 44b may engage such that the support cylinder 44b is screwed into the second filter 44. The support cylinder 44b may be optional. In such an alternative embodiment, the lower section of the second filter 44 may be configured to couple to an outer side surface of the lower filter cover 43.

The first wireless power transfer device 72 may be provided under the bottom plate 12 in an inner space of the protrusion 121. The second wireless power transfer device 73 may be provided in a space of the inner assembly 100 between an upper surface of the support cylinder 44b, the second filter 44, and the support plate 44a. A coupling of the second filter 44, the support cylinder 44b and the support plate 44a may be configured such that the space is a sealed or dry space. The lower section of the second filter 44 may not include through holes to prevent leaking and/or flooding.

Positions of the first and second wireless power transfer devices 72 and 73 may be configured so that the first and second wireless power transfer devices 72 and 73 align with each other when the lower filter cover 43 is inserted onto the protrusion 121. Therefore, wireless power may be exchanged between the first and second wireless power transfer devices 72 and 73.

In order to efficiently transmit the wireless power using, an alignment between the first wireless power transfer device 72 and the second wireless power transfer device 73 must be maintained and stable. Although a vertical alignment of the first and second wireless power transfer devices is shown and described, embodiments disclosed herein are not limited to such a vertical alignment. As an alternative example, the first wireless power transfer device 72 may be provided at a side of the water tank 10, and a position of the second wireless power transfer device 73 may be configured to face the first wireless power transfer device 72. If the first and second wireless power transfer devices 72 and 73 become misaligned, wireless power efficiency may be reduced.

Figure 5:
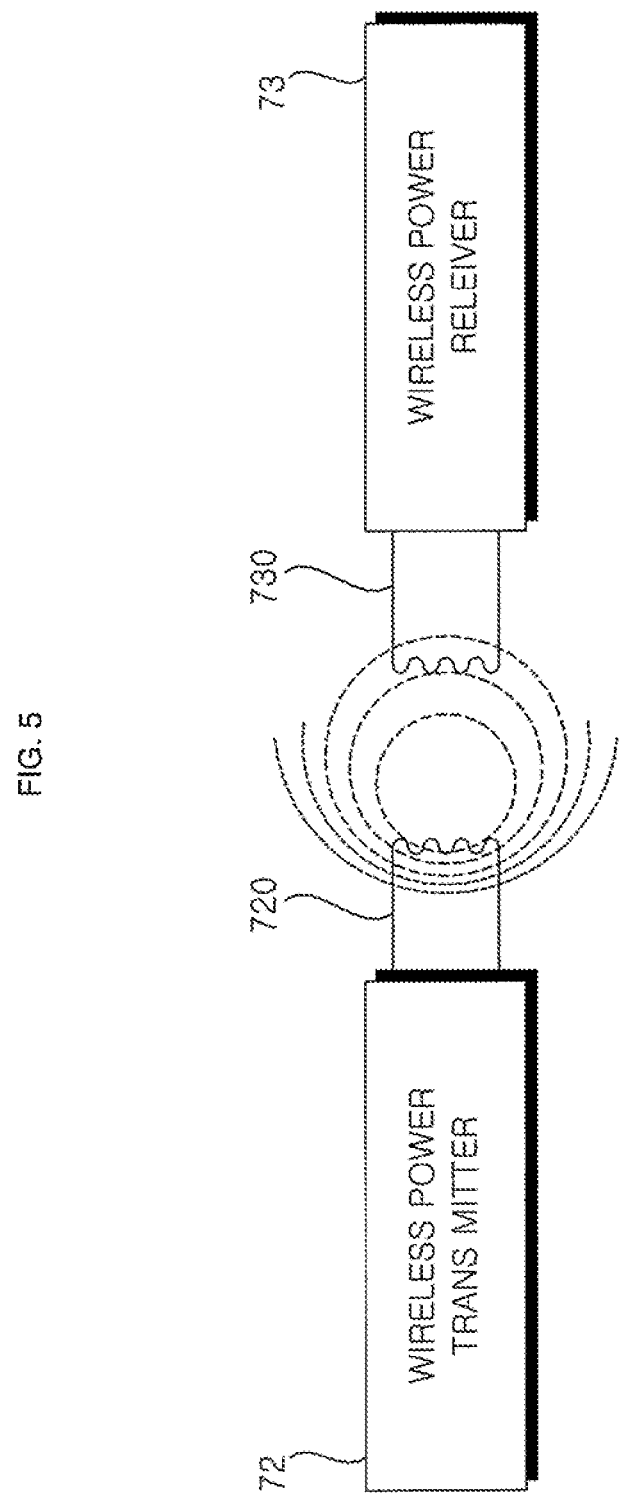
FIG. 5 is an example of an internal block diagram of a wireless power transmission according to the an embodiment.

Although the first and second wireless power transfer devices 72 and 73 may each be transceivers capable of both transmitting and receiving wireless power, for convenience of description, an example where the first wireless power transfer device 72 is a transmitter and where the second wireless power transfer device 73 is a receiver will be described. Referring to FIG. 5, the wireless power transmitter 72 may transmit power wirelessly to the wireless power receiver 73 via electromagnetic induction.

The wireless power transmitter 72 may generate a changing magnetic field by applying a current to a transmitting coil 721 so that an induction current is induced in a receiving coil 731 of the wireless power receiver 73. The wireless power transmitter 72 and the wireless power receiver 73 may use a wireless power transmission system of the electromagnetic induction method as defined in Wireless Power Consortium (WPC).

The wireless power transmitter 72 may wirelessly induce a current in the wireless power receiver 73 so that power may be transmitted over the air. Bidirectional communication, unidirectional communication, and/or half-duplex communication may be possible between the wireless power transmitter 72 and the wireless power receiver 73. In addition, communication may include and in-band communication method using a same frequency band and/or an out-of-band communication method using different frequency bands.

The wireless power transmitter 72 and the wireless power receiver 73 may exchange information such as state, condition, or coupling information of the docking station 71, water tank 10, and/or the inner assembly 100, power usage information, battery charging information of the battery B, battery output voltage/current information, control information, or information from various sensors (e.g., proximity sensor, temperature sensor, contamination level sensor, and weight or load sensor). A power transmission method may be changed based on such information so that power consumption may be efficient.

The wireless power transmission method may be safer than other transmission methods, as a risk of shock may be reduced because there are less wires a pet may be tempted to bite. Additionally, the controller C may be able to sense coupling information between the inner assembly 100 and the bottom plate 12 and between the base plate 18 and the docking station 71 such that, when the controller C senses that the inner assembly 100 has been knocked off the bottom plate, a power transmission may be stopped to prevent unintended electrical shock.

Figure 6:
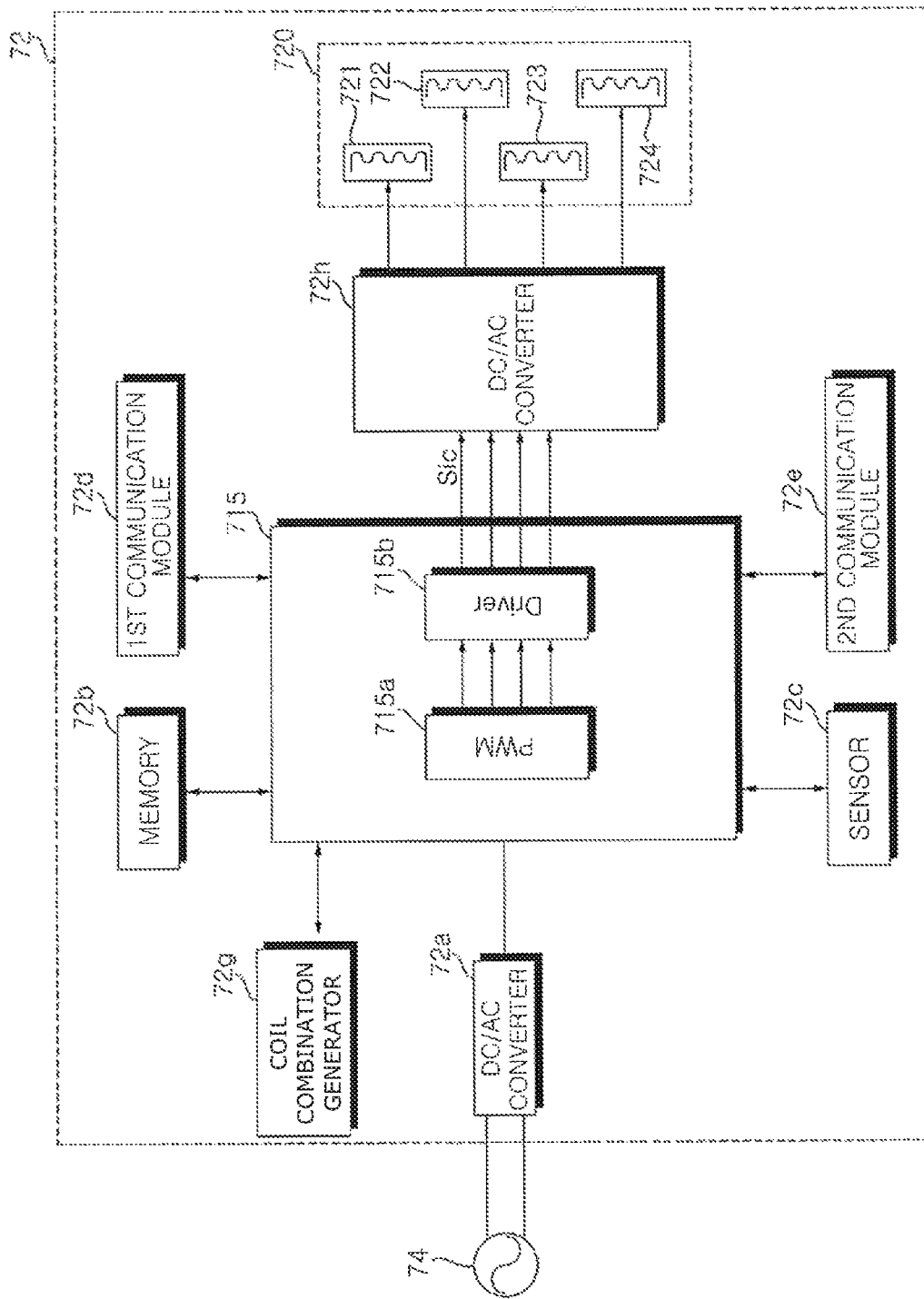
FIG. 6 is an internal block diagram of a first wireless power transfer device of FIG. 5.

Referring to FIG. 6, the wireless power transmitter 72 may include an AC/DC converter 72a to convert an alternating current (AC) carried to the connection terminal 74 to a direct-current power supply. The wireless power transmitter 72 may also include a wireless power driver or DC/AC converter 72h to convert DC power into AC power. The DC/AC converter 72h may also be referred to as a regulator. A coil assembly 720 may include a plurality of transmitting coils 721-724 to transmit power wirelessly using the converted AC power from the DC/AC converter 72h.

A power circuit device 715 on a printed circuit board (PCB) may control an internal configuration of the wireless power transmitter 72. At least one coil combination generator or coil selector 72g may generate combinations of which of the plurality of transmitting coils 721 and 724 should be used. The wireless power transmitter 72 may further include first and second communication modules 72d and 72e, a sensor 72c to sense a flow of current from the wireless power transmitter 72 to the wireless power receiver 73, a temperature of the coil assembly 720, and a memory 72b to store a control program for an operation of the wireless power transmitter 72. The sensor 72c may detect a position of the wireless power receiver 73 so that the coil combination generator 72g may generate an effective coil combination.

The AC/DC converter 72a may be a diode without a switching element, and may perform a rectifying operation or noise reduction without a separate switching operation. Alternating current may be applied to the connection terminal 74, and the AC/DC converter 72a may convert the alternating current to direct current, which may be applied to the power circuit device 715. Direct current output from the power circuit device 715 may be converted back to alternating current via the DC/AC converter or regulator 72h so that an alternating current may be applied to the coil assembly 720 to induce a changing magnetic field and therefore induce a current in the receiving coil 731 (FIG. 4) of the wireless power receiver 73.

The power circuit device 715 may include a pulse-width modulation (PWM) device 715a to generate a PWM signal, which may be provided to a driver 715b. The driver 715b may generate and output a drive signal (Sic). The PWM signal generated by the PWM device may control a power transmission rate or current flowing to the DC/AC converter 72h. The PWM device 715a may periodically reduce an amount of current supplied to the driver 715b to create a pulsing current. The PWM device 715a may generate the PWM signal based on determinations by the controller C and/or sensed values of the sensor 72c. The driver 715b may output, on the basis of the PWM signal, a corresponding drive signal Sic to drive and/or operate the DC/AC converter 72h.

The plurality of transmitting coils 721-724 in the coil assembly 720 may deliver a stable power by expanding a wireless power transmission area so that the wireless power transmitter 72 may provide power to the wireless power receiver 73 even if the wireless power transmitter and receiver 72 and 73 become misaligned due to, for example, a movement of the inner assembly 100 inside the water tank 10.

Figure 7:
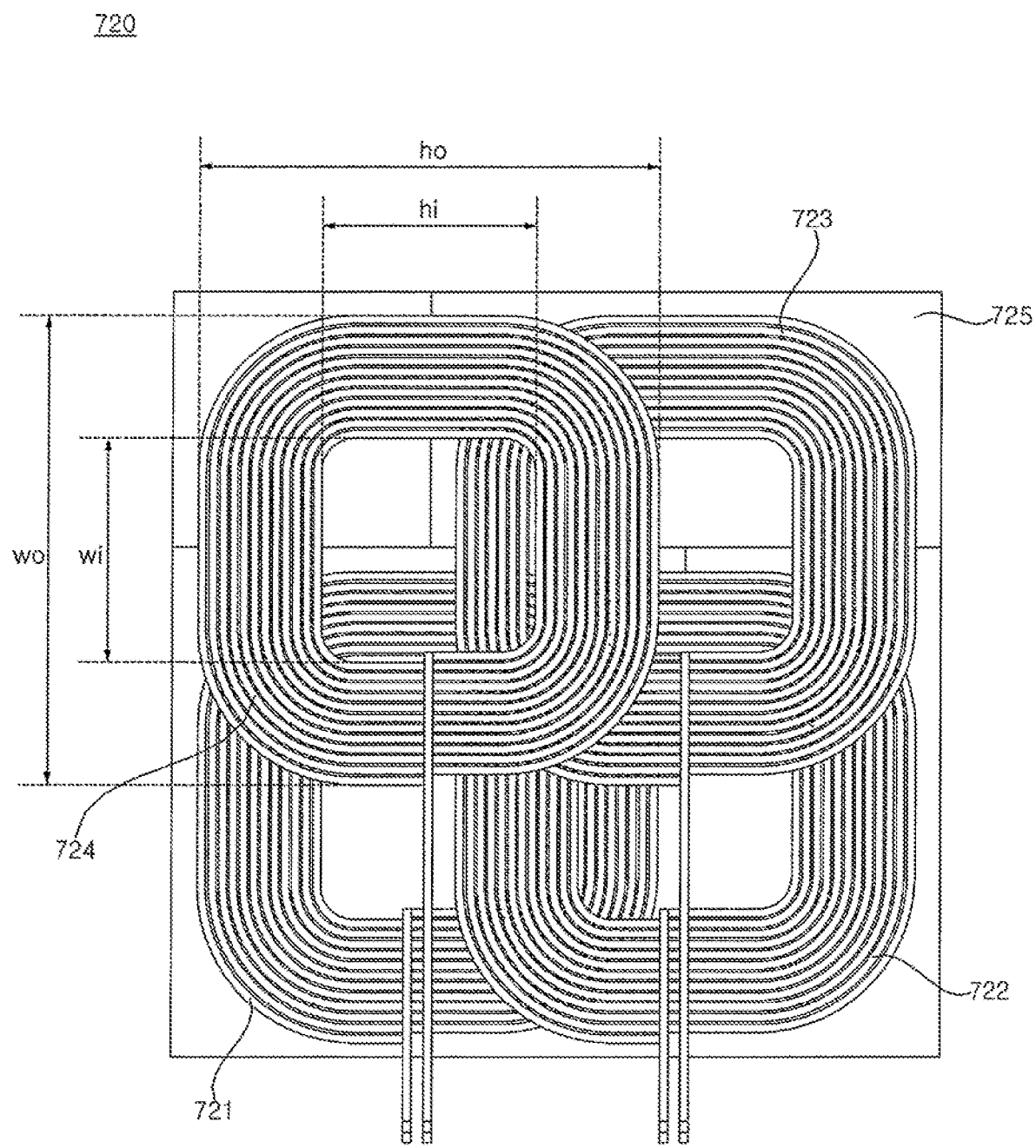
FIG. 7 is a view explaining a coil structure of FIG. 5.
Figure 8:
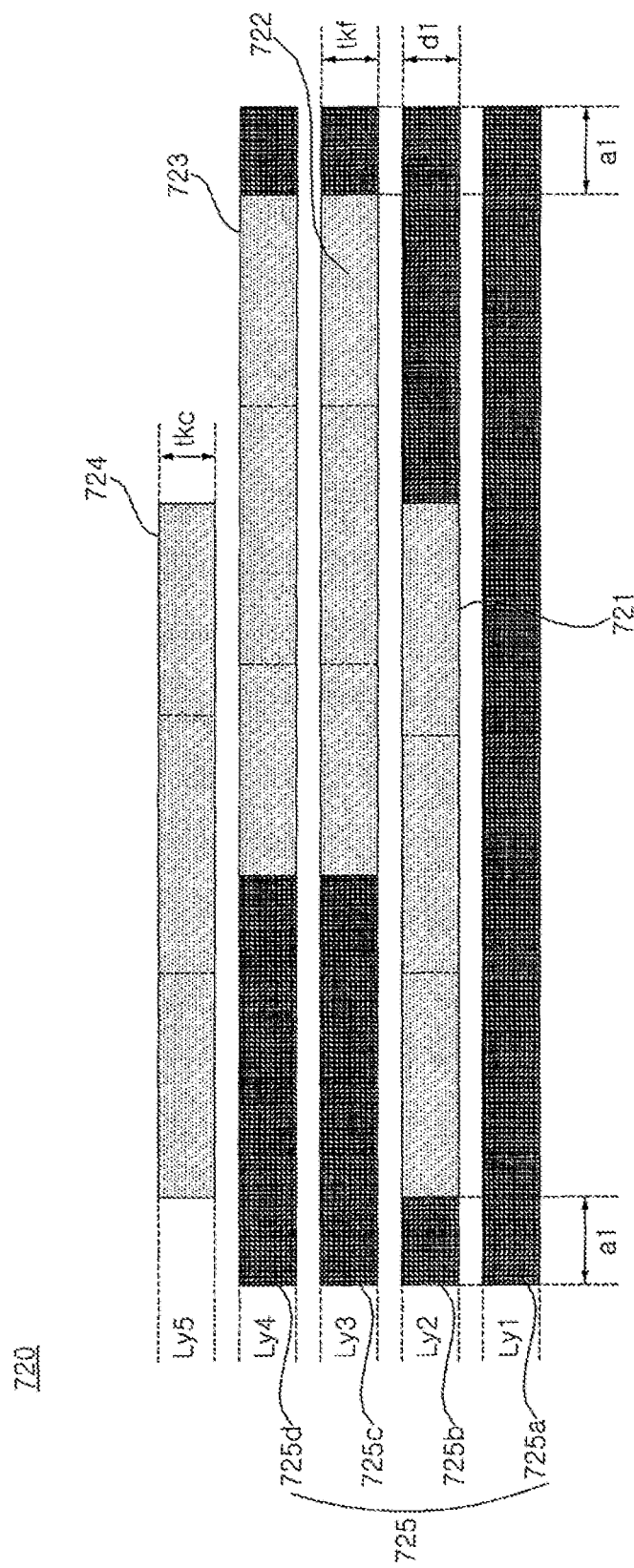
FIG. 8 is a side view showing the coil structure of FIG. 7.

Referring quickly to FIGS. 7-8, the plurality of transmitting coils 721-724 may partially overlap with each other. The coil assembly 720, through any combination of coils selected from the plurality of transmitting coils 721-724, may wirelessly transmit power to the wireless power receiver 73. The coil assembly 720 may include a shielding layer or material 725 provided on at sides of the plurality of transmitting coils 721-724 to shield the transmitting coils 721-724 from magnetic field leakage or an unintended magnetic field and/or prevent eddy currents.

Referring back to FIG. 6, the coil combination generator 72g may generate a combination of coils among the plurality of transmitting coils 721-724 based on information exchanged between the first and second wireless power receivers 72 and 73. The first communication module 72d may use a first communication method (e.g., in-band communication method) to transmit status information, power control information, etc. of the wireless power transmitter 72 to the wireless power receiver 73. The first communication module 72b may also use the first communication method to receive and process status information, power usage information, charging efficiency information, etc. of the wireless power receiver 73 and transmit processed information to the power circuit device 715.

The second communication module 72e may use a second communication method (e.g., out-of-band communication method) to transmit status information, power control information, etc. of the wireless power transmitter 72 to the wireless power receiver 73. The second communication module 72e may also use the second communication method to receive and process status information, power usage information, charging efficiency information, etc. of the wireless power receiver 73 and transmit processed information to the power circuit device 715.

The first communication method may be different from the second communication method, and may be changed based on power information, status information, etc. As an example, the first communication method may be an in-band communication method using a same frequency band as the wireless power receiver 73. The second communication method may be an out-of-band communication method using a different frequency band than the wireless power receiver 73. The wireless power transmitter 72 may change between the first and second communication methods based on power information of the wireless power receiver 73. As an alternative, one of the first and second communication modules 73d and 73e may be omitted.

The first and second communication modules 72d and 72e may modulate and/or demodulate a data signal transmitted from the wireless power transmitter 72 and a data signal received from the wireless power receiver 73, and may further include a modulation and demodulation device. Also, the first and second communication modules 72d and 72e may include a filter device to filter a data signal received from the wireless power receiver 73. The filter device may be provided with a Band Pass Filter (BPF).

The sensor 72c may sense a current or voltage of the power transmitted to the wireless power receiver 73 and also power to be provided to the power circuit device 715. The sensor 72c may also sense a temperature of the plurality of transmitting coils 721-724 and/or shielding layer 725 and provide a measurement to the power circuit device 715 so that a controller of the printed circuit device 715 may determine whether or not the wireless power transmitter 72 is overheated. If the sensor 72c senses a temperature or voltage greater than predetermined maximum temperature or voltages, an operation of the wireless power receiver 73 may be stopped via a controller in the power circuit device 715 and/or a controller C in the inner assembly.

The memory 72b may store a program for operation of the wireless power transmitter 72. The memory 72b may also store information from the various sensors (e.g., sensor 72c and/or weight sensor, proximity sensor, etc. provided in the container support 11b). The sensor 72c may also be an object sensor to detect an object on a receiving surface or within a predetermined reception area of the plurality of coils 721-

724, and the memory 72b may store data on an intensity of an object detection signal from such a sensor.

The sensor 72c may detect whether the wireless power receiver 73 is present in the reception area based on a current magnitude or current deviation from the transmitting coils 721-724 when transmitting an initial coil selection signal and also based on an object detection signal. The object detection signal may be an analog ping (AP) signal of a very short pulse. The sensor 72c of the wireless power transmitter 72 may transmit an analog ping (AP) signal at predetermined time intervals until the wireless power receiver 73 is detected in the reception area and/or on the receiving surface. The wireless power transmitter 72 may transmit the object detection signals in a predetermined order through the plurality of transmitting coils 721-724, and based on an amount of change in current through the plurality of transmitting coils 721-724, a presence of the wireless power receiver 73 in the reception area may be detected.

The memory 72b may store data on intensities or magnitudes of the current through the plurality of transmitting coils 721-724. An intensity or magnitude of the object detection signal (i.e., the analog ping signal) and magnitudes of the current through the plurality of transmitting coils 721-724 based on an initial coil selection signal may be compared to generate a factory calibrated signal or a predetermined signal. Alternatively or in addition thereto, a position of the wireless power receiver 73 may be determined by analyzing the coil inductances of the plurality of transmitting coils 721-724.

As shown in FIGS. 7-8, the plurality of transmitting coils 721 to 724 may be partially overlapped. When the object detection signal and the initial coil selection signal and/or currents through the plurality of transmitting coils 721-724 are transmitted at a same transmission intensity, the intensity of each of the object detection signal and the initial coil selection signal on the receiving surface or within the reception area on which the wireless power receiver 73 is provided may be different. An intensity or magnitude difference between the object detection signal and the initial coil selection signal and/or currents through the plurality of transmitting coils 721-724 may cause errors in sensing and operating coil combinations.

In order to solve such a problem, intensities or magnitudes of the object detection and initial coil selection signals and/or currents through the transmitting coils 721-724, along with a distance between the wireless power transmitter 72 and receiver 73, may be configured accordingly. For example, the greater the distance between a receiving surface on which the wireless power transmitter 72 is placed and the coil assembly 720 of the wireless power transmitter 72, the greater the intensity or magnitude of the object detection signal and the intensity of the initial coil selection signal and/or currents through the plurality of transmitting coils 721-724. Accordingly, intensities or magnitudes of each object detection and coil selection signals may all be the same. Also, an intensity or magnitude of each initial coil selection signal from each of the plurality of transmitting coils 721-724 may be the same. A factory calibration based on the intensity of the object detection signal and the intensity of the coil selection signal may be stored in the memory 72b.

Referring back to FIG. 6, the power circuit device 715 may control general operations of the wireless power transmitter 72. The coil combination generator 72g may generate a selection of coil combinations among the plurality of transmitting coils 721-724, and the power circuit device 715 may control an operation of the plurality of transmitting coils 721-724 based on the generated coil selection of the coil combination to deliver power to the wireless power receiver 73.

The power circuit device 715 may be coupled or electrically connected to the coil combination generator 72g. Based on the generated selection of coil combination, the power circuit device 715 may transmit a coil selection signal to operate certain selected coils among the plurality of transmitting coils 721-724, and may receive a response signal for coil selection.

Referring to FIGS. 2-3, the power circuit device 715 may be provided below the wireless power transmitter 72. Alternatively, the power circuit device 715 may be provided inside wireless power transmitter 72, as shown in FIG. 6.

Referring back to FIG. 6, the power circuit device 715 may implement wireless power transmission via a coil combination generated by the coil combination generator 72g, which may be generated based on a strength of a response signal from the wireless power receiver 73. The printed circuit board 715 may then transmit power to the wireless power receiver 73 via the selected coils of the plurality of coils 721-724.

The coil combination generator 72g may generate the initial coil selection signal transmitted through the plurality of coils 721-724. The coil combination generator 72g and/or the power circuit device 715 may determine, by detecting a change in current with respect to the initial coil selection signal via the sensor 72c, an invalid coil. When an invalid coil is detected, the coil combination generator 72g may generate a coil combination that does not use the invalid coil. In addition, the coil combination generator 72g may determine how many coils to use in the coil combination based on a calculated power required by the wireless power receiver 73. The coil assembly 720 may receive signals from the printed circuit board 715 and/or the coil combination generator 72g indicating which coils of the plurality of transmitting coils 721-724 to operate.

Referring to FIGS. 7-8, since the coil assembly 720 may include the plurality of transmitting coils 721 to 724 instead of a single large coil, a reception area may be focused and/or customized and may reduce stray magnetic fields. In addition, the reception area may be changed depending on positions and/or an alignment of the wireless power transmitter and receiver 72 and 73 so that, even if the wireless power receiver 73 is shifted with a movement of the inner assembly 100, a stable power transfer process may be maintained.

The plurality of transmitting coils 721-724 may include first to fourth coils 721 to 724, respectively; however, the plurality of transmitting coils 721-724 is not limited to four coils. The first to fourth coils 721-724 may be arranged so that some regions overlap each other. As an example, the first coil 721 may be partially overlapped with the second coil 722, the second coil 722 may be partially overlapped with the third coil 723, and the third coil 723 may partially overlapped with the fourth coil 724. An overlap region of the first to fourth coils 721 to 724 may be set so that dead zones or non-chargeable regions occurring at centers of the coils are minimized.

The first to fourth coils 721 to 724 may have a predetermined outer length ho, an inner length hi, an outer width wo, an inner width wi, a thickness, and a prescribed number of windings. The first to fourth coils 721-724 may be planar, and the windings may have a spiral configuration. However, embodiments disclosed herein are not limited to planar first to fourth coils 721-724. The outer length ho, the inner length hi, the outer width wo, and the inner width wi of the first to fourth coils 721 to 724 may be the same. The outer lengths and widths ho and wo may be a length and width corresponding to an outer perimeter of a coil 721-724, while the inner length and width hi and wi may correspond to a length and width corresponding to an space or hole provided at a center of or through the coil.

The first to fourth coils 721-724 may resemble curved squares or rectangles, but shapes of the first to fourth coils 721-724 are not limited thereto. For example, the first to fourth coils 721-724 may have a circular or disc shape, or a polygonal shape. (e.g., hexagonal).

The fourth coil 724 may be provided closest to the wireless power receiver 73, and the inductance of the fourth coil 724 may be set to be smaller than an inductance of the first to third coils 721 to 723. The inductances of the first to fourth coils 721-724 may be preset or configured to maintain a constant power transmission or power efficiency of the surface of the coil assembly 720.

The shielding layer 725 may include a ferrite material composed of at least one of cobalt (Co), iron (Fe), nickel (Ni), boron (B), or silicon (Si). The shielding member 725 may be provided under and/or at sides of the coils 721-724 so as to shield an unintended magnetic field from the first to fourth coils 721 to 724 and to maximize the directionality of the magnetic field generated by the first to fourth coils 721 to 724.

Since the first to fourth coils 721 to 724 are only partially overlapped with each other, separation distances or spaces may be formed between the coils at locations that don't immediately overlap with other coils. For example, the first coil 721 and the second coil 722 may only partially overlap, and there may be a vertical distance formed between a non-overlapping portion of the second coil 722 and a bottom of the coil assembly 720. As another example, since the fourth coil 724 only partially overlaps with the third coil 723, there may be a space or distance between a non-overlapping portion of the fourth coil 724 and a non-overlapping portion of the second or first coils 722 or 721. The distance between non-overlapping portions of subsequent coils may be represented by distance d1 in FIG. 8.

The separation or gaps between non-overlapping portions of the first to fourth coils 721-724 may reduce transmission efficiency by allowing an induced magnetic field to be dispersed, and non-overlapping portions of the coils 721-724 may be vulnerable to breaking. Therefore, the shielding layer 725 may include a plurality of shielding layers 725a through 725d to fill the gaps between non-overlapping portions of the coils 721-724.

The plurality of shielding layers 725a-725d and the plurality of transmitting coils 721-724 may be arranged in a plurality of vertical layers ly1 to ly5. A first or base layer ly1 may include only a shielding layer 725a, a top or fifth layer ly5 may include only a coil 724, and the layers between the first and fifth layers ly2-ly4 may each include a coil and a shielding layer among the rest of the coils 721-23 and shielding layers 725b-d, respectively.

Although FIG. 8 shows that the first to fifth layers ly1 through ly5 are slightly spaced apart from each other, this space is for convenience of explanation. In reality, the first through fifth layers ly1 and ly5 may directly contact each other. Thicknesses tkf of the shielding layers 725a-725d may be equal to the thicknesses tkc of the first to fourth coils 721 to 724, respectively. In addition, thicknesses tkf of the shielding layers 725a-725d may be equal to distances d1 between the non-overlapping portions of the coils since the shielding layers 725a-725d may fill the gaps between the coils 721-724. The first to fourth coils 721 to 724 may be adhered to corresponding shielding layers 725a-725d of the shielding layer 725.

The first layer ly1 may include a base or bottom shielding layer 725a that extends across the entire first layer ly1. The second layer ly2 of the coil assembly 720 may include the first coil 721 and a first shielding layer 725b provided at lateral sides of the first coil 721. The second layer ly2 may be provided on (e.g., adhered to) the first layer ly1, so the first coil 721 and the first shielding layer 725b may both be provided on the base shielding layer 725a.

The third layer ly3 may include the second coil 722 and a second shielding layer 725c provided at lateral sides of the second coil 722. The second coil 722 may not perfectly align with the first coil 721 and instead be positioned to partially overlap with the first coil 721 and the first shielding layer 725b. The first shielding layer 725b may support a non-overlapping portion of the second coil 722.

A fourth layer ly2 may include the third coil 723 and the third shielding layer 725d. The third coil 724 may be aligned with the second coil 722 to overlap with the second coil 722. Although FIG. 8 shows that the third coil 723 is provided directly above the second coil 722 so as to completely overlap (such that there may be a gap between the first and fourth coils 721 and 724 that may be approximately twice d1), configurations of the first through fourth coils 721 through 724 are not limited hereto. If the third coil 723 only partially overlapped with the second coil 722, the second shielding layer 725c would support a non-overlapping portion of the third coil 723.

The fifth layer ly5 may include the fourth coil 724, which may be partially overlapped with the third coil 723. The third shielding layer 725d may support a non-overlapping portion of the fourth coil 724. As an alternative, the fifth layer ly5 may optionally include a fourth shielding layer provided at lateral sides of the fourth coil 724.

The fifth layer ly5 may be provided on the fourth layer ly4, which may be provided on the third layer ly3, which may be provided on the second layer ly2, which may be provided on the first layer ly1. The fourth coil 724 may be provided on the third coil 723 and adhered to the third shielding layer 725d, the third coil 723 may be provided on the second coil 722 and/or adhered to the second shielding layer 725c, the second coil 722 may be provided on the first coil 721 and adhered to the first shielding layer 725b, and the first coil 721 may be adhered to the base shielding layer 725a.

Configurations of the first through fourth coils 721-724 and base through third shielding layers 725a-725d are not limited to those exemplified in FIG. 8, and may be configured depending on a desired magnetic field strength and to prevent external shock. Since the shielding layers 725a-725d are provided at lateral sides of each coil, transmission efficiency may be improved as the shielding layers 725a-725d block unintended magnetic fields and/or eddy currents, and may focus an induced magnetic field toward the wireless power receiver 73. Furthermore, a generation of heat may be reduced due to the first through fourth shielding layers 725a-725d.

The shielding layer 725 may span an area larger than an area where the first to fourth coils 721 to 724 are provided such that the shielding member 725 is larger than the outer lengths and widths h0 and wo of the first to fourth coils 721 to 724. For example, as shown in FIG. 8, the shielding member 725 may be formed to extend by a distance of a1 from lateral sides, in addition to outer longitudinal sides, of the first to fourth coils 721 to 724.

As described above, the coil assembly 720 may change an amount or a direction of power that is wirelessly transmitted by combining a plurality of coils 721-724 according to a power situation. Therefore, power may be transmitted corresponding to a required amount of power or a power usage rate in the inner assembly 100, thereby enabling efficient power management.

Hereinafter, a method of controlling power delivered by combining a plurality of transmitting coils 721 to 724 will be described. Referring to FIGS. 6-8, the coil combination generator 72b may create a coil combination, or a combination of coils from the plurality of coils 721-724, and the power circuit device 715 may control current to be applied to only the coils selected as part of the coil combination. The number of coils used in the coil combination may vary depending on an amount of power consumed in the inner assembly 100. A larger amount of power consumed by the inner assembly 100 will require current to be applied to a larger number of coils in the plurality of coils 721-724.

For example, when a power consumption of the inner assembly 100 is large, the coil combination generating unit 72b may produce a coil combination using all four of the first to fourth coils 721 to 724. When a power consumption of the inner assembly 100 is a little less, the coil combination generator 72b may produce a coil combination using only adjacent coils depending on an alignment of wireless power transmitter and receiver 72 and 73 or depending on a detected position of the receiving coil 731 by the sensor 72c.

For example, when the wireless power receiver 73 is parallel to the ground and/or properly aligned with the wireless power transmitter 72, the fourth coils 724 may be closest to the receiving coil 731, so the coil combination generated by the coil combination generator 72b may include the fourth coil 724 and add on other coils sequentially depending on a power requirement. For example, the generated coil combination may be the fourth and third coils 724 and 723, or the fourth, third, and second coils 724, 723, 722, etc., but may not necessarily be, e.g., only the fourth and second coils 724 and 722.

When the wireless power receiver 73 is inclined and not parallel to the ground, coils closer to the ground (i.e., the first coil 721) may be combined first or added first to a pre-existing coil combination. Therefore, even if the inner assembly 100 is impacted and the wireless power receiver 73 becomes misaligned, wireless power transmission may be maintained.

Figure 9:
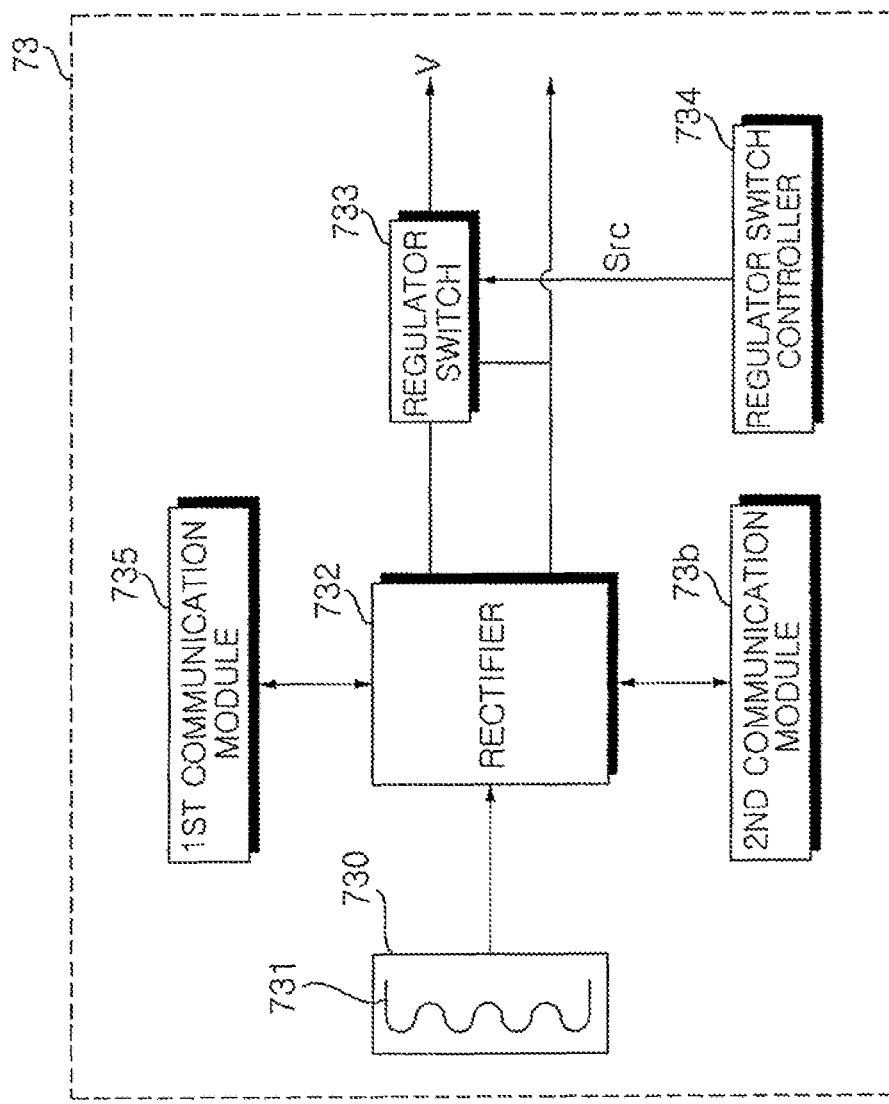
FIG. 9 is an internal block diagram of a second wireless power transfer device of FIG. 5.

Referring to FIG. 9, the wireless power receiver 73 may include a power receiver 730 which includes the receiving coil 731 that receives wireless power from the plurality of transmitting coils 721-724 of the wireless power transmitter 72. The wireless power receiver 73 may further include a rectifying device or rectifier 732 that rectifies or reduces noise from received wireless power, a switching regulator or regulator switch 733 to stabilize power, and a switching regulator control module 734 to control the switching regulator 733 to output operation power. The wireless power receiver 73 may further include a first communication module 735 and a second communication module 736 to communicate with the first and second communication modules 72d and 72e of the wireless power transmitter 72.

The receiving coil 731 of the power receiver 730 may receive wireless power transmitted from the coil assembly 720. An induction electromotive force can be generated in the receiving coil 731 by a magnetic field generated in any one of the transmitting coils 721 to 724. The wireless power produced by the induced electromotive force may be supplied directly to the inner assembly 100 using radio or wireless power through the rectifying device 732 and the switching regulator 733 described later, or may charge the battery B provided inside the inner assembly 100.

The receiving coil 731 may be formed as a thin conductive pattern on a printed circuit board (PCB). The receiving coil 731 can be printed in a closed loop shape on a receiving pad. A polarity of the receiving coil 731 may be such that it has a polarity in a same direction as the transmitting coils 721-724, As can be appreciated, the wireless power receiver 73 may include the components of FIG. 6 and additional coils similar to FIG. 7, and the wireless power transmitter 72 may include the components of FIG. 9 for bi-directional wireless power transfer.

The rectifying device 732 may rectify radio or wireless power received through the receiving coil 731 when receiving the wireless power (i.e., the induced magnetic field and current) from the wireless power transmitter 72. The rectifying device 732 may include at least one diode element.

The switching regulator 733 may output rectified wireless power to charge the battery B under a control of the switching regulator control module 734. The switching regulator control module 734 may apply a regulator control signal Src to the switching regulator 733 to output a charging power supply or an output voltage V to the battery B.

The switching regulator 733 may perform AC-DC conversion according to a regulator control signal Src of the switching regulator control module 734 to adjust an output voltage. Based on the regulator control signal Src, the switching regulator 733 may control the output voltage V to have a predetermined voltage.

The wireless power receiver 73 may not include a separate microprocessor, and when a rectified output voltage B is output by the switching regulator 733 with a voltage of a predetermined magnitude, the switching regulator control module 734 may control the switching regulator 733 accordingly. When the wireless power receiver 73 does not have a microprocessor, a hardware configuration may be simplified and a power consumption may be reduced.

This application is related to U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 iled on Sep. 13, 2019, U.S. application Ser. No. 16/569,827 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920 filed on May 24, 2019; and 10-2019-0080603 and 10-2019-0080604 filed on Jul. 4, 2019.

A water tank may have an upper opening. A pump may be installed inside the water tank, a water supply pipe may be connected to the pump to transport water, and the water supply pipe may communicate with a water supply hole formed in a water supply plate. An inner assembly may include the water supply plate. Water may be supplied to the water supply plate and guided back to the water tank via a water guide. A wireless power transmitter to transmit power to the inner assembly and a wireless power receiver may be further provided. The wireless power transmitter may include a coil portion or assembly having a plurality of coils or transmitting coils partially overlapping.

A pet water dispenser according to embodiments disclosed herein may easily transfer power to an inner assembly without a complicated electric wire connection, may separate the inner assembly from a water tank easily, and may be easy to maintain, clean, and repair. Depending on an amount of power used in the inner assembly, a number of operation coils to be operated can be varied and wireless power transmission can be effectively performed. Since the number of operating coils can be varied according to the amount of power required, the pet water dispenser may be compatible with various power quantities. Power may be transmitted via a coil combination rather than a single coil, to transmit wireless power, and wireless power transfer stability may be improved.

Embodiments disclosed herein may be implemented as a liquid dispenser comprising a tank having an upper opening, a wireless power transmitter having a plurality of transmitting coils that at least partially overlap with each other, a pump, a pipe connected to the pump to transfer liquid, a plate including a hole communicating with the pipe, and a wireless power receiver having a receiving coil that receives an induced current from the plurality of transmitting coils to power the pump.

The wireless power transmitter may be provided below a bottom plate of the tank, and the wireless power receiver may be provided above the bottom plate of the tank. An inner assembly may be configured to be removable from the tan. The inner assembly may include the pump, pipe, plate, and wireless power receiver. A bottom plate of the tank may be formed with a protrusion protruding upward. The inner assembly may include a lower filter cover formed with a concave cavity configured to fit on top of the protrusion.

An inner assembly may be configured to be removable from the tank. The inner assembly may include the pipe, plate, wireless power receiver, a first filter, a second filter provided inside the first filter, and the pump inside of the second filter. A lower filter cover may be coupled to a lower end of the first filter. A support cylinder may be provided between the lower filter cover and a lower end of the second filter. The support cylinder may have a concave cavity in which an upper surface of the lower filter cover may be inserted. A bottom plate of the tank may be formed with a protrusion configured to be inserted into the lower filter cover. The wireless power transmitter may be provided in an inner space of a protrusion under the bottom plate. The wireless power receiver may be provided in a space between the second filter and the support cylinder.

The plurality of transmitting coils may include four coils that partially overlap each other in a vertical direction. The plurality of coils may be provided at different heights from each other. Each of the coils may have an outer perimeter and an inner perimeter defining a space. Lengths and widths of the outer perimeters of the coils may be equal to each other, and lengths and widths of the inner perimeters may be equal to each other.

A shielding layer may be provided at lateral sides of the coils. The shielding layer may span a greater area than the plurality of coils. A plurality of shielding layers may be provided at lateral sides of each of the plurality of coils to create layers consisting of one shielding layer and one coil. The layers may be stacked on top of each other.

A plurality of shielding layers may be provided at lateral sides of each of the plurality of coils to fill a vertical space between non-overlapping portions of the coils.

An uppermost coil among the plurality of coils may have a smaller inductance than the other coils of the plurality of coils.

Embodiments disclosed herein may be implemented as a wireless power transmission system comprising a wireless power transmitter having a plurality of transmitting coils that at least partially overlap with each other in a vertical direction, a wireless power receiver having a receiving coil that receives an induced current from the plurality of transmitting coils to power the pump, a plurality of shielding layers provided at lateral sides of each of the plurality of coils to fill a vertical space between non-overlapping portions of the coils, a sensor to sense a position of the receiving coil relative to the plurality of transmitting coils, and, a coil combination generator to generate a combination of transmitting coils among the plurality of transmitting coils based on a position sensed by the sensor.

An uppermost coil among the plurality of coils may have a smaller inductance than the other coils of the plurality of coils. The plurality of transmitting coils may include a first coil, a second coil provided on top of the first coil at a position that partially vertically overlaps with the first coil, a third coil provided on top of the second coil at a position that corresponds to and vertically overlaps with the second coil, and a fourth coil provided on top of the third coil at a position that corresponds to and vertically overlaps with the first coil and that partially vertically overlaps with the third coil.

In the drawings, thicknesses may be enlarged to clearly indicate layers and regions. In the drawings, for the convenience of explanation, the thicknesses of some layers and regions are exaggerated.

Further, when a layer, a film, a region, plate etc. is said to be "over" or "on top" of (or "below" or "under") another portion, another element may intervene. Conversely, when a part is said to be "directly on" (or "directly below" or "directly underneath") another part, there may be no element intervening between the two parts.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
   a tank having an upper opening;
   a wireless power transmitter;
   a pump;
   a pipe connected to the pump to transfer liquid;
   a plate including a hole communicating with the pipe; and
   a wireless power receiver having a receiving coil that receives an induced current from the wireless power transmitter to power the pump,
   wherein the wireless power transmitter includes a plurality of transmitting coils that at least partially overlap with each other, and a shield member surrounding lateral sides of the plurality transmitting coils.

2. The liquid dispenser of claim 1, wherein the wireless power transmitter is provided below a bottom plate of the tank, and the wireless power receiver is provided above the bottom plate of the tank.

3. The liquid dispenser of claim 1, further including an inner assembly configured to be removable from the tank, the inner assembly including the pump, pipe, plate, and wireless power receiver, wherein a bottom plate of the tank is formed with a protrusion protruding upward, and the inner assembly includes a lower filter cover formed with a concave cavity configured to fit on top of the protrusion.

4. The liquid dispenser of claim 1, further including an inner assembly configured to be removable from the tank, the inner assembly including the pipe, plate, wireless power receiver, a first filter, a second filter provided inside the first filter, and the pump inside of the second filter.

5. The liquid dispenser of claim 4, wherein a lower filter cover is coupled to a lower end of the first filter.

6. The liquid dispenser of claim 5, wherein a support cylinder is provided between the lower filter cover and a lower end of the second filter, and the support cylinder has a concave cavity in which an upper surface of the lower filter cover is inserted.

7. The liquid dispenser of claim 6, wherein a bottom plate of the tank is formed with a protrusion configured to be inserted into the lower filter cover, the wireless power transmitter is provided in an inner space of a protrusion under the bottom plate, and the wireless power receiver is provided in a space between the second filter and the support cylinder.

8. The liquid dispenser of claim 1, wherein the plurality of transmitting coils includes four coils that partially overlap each other in a vertical direction.

9. The liquid dispenser of claim 1, wherein the plurality of transmitting coils are provided at different heights from each other.

10. The liquid dispenser of claim 1, wherein each of the plurality of transmitting coils have an outer perimeter and an inner perimeter defining a space, lengths and widths of the outer perimeters of the plurality of transmitting coils are equal to each other, and lengths and widths of the inner perimeters of the plurality of transmitting oils are equal to each other.

11. The liquid dispenser of claim 1, wherein the shielding member surrounds lateral sides of at least one of the plurality of transmitting coils.

12. The liquid dispenser of claim 1, wherein the shielding member spans a greater area than the plurality of transmitting coils.

13. The liquid dispenser of claim 1, wherein the shielding member includes a plurality of shielding layers surrounding each of the plurality of the transmitting coils, and the plurality of transmitting coils and the plurality of shielding layers form a plurality of lavers.

14. The liquid dispenser of claim 1, wherein the shielding member includes a plurality of shielding layers filling a vertical space between non-overlapping portions of the transmitting coils.

15. The liquid dispenser of claim 1, wherein an uppermost transmitting coil among the plurality of transmitting coils has a smaller inductance than the other transmitting coils of the plurality of transmitting coils.

16. A wireless power transmission system, comprising:
a wireless power transmitter having a plurality of transmitting coils that at least partially overlap with each other in a vertical direction;
a wireless power receiver having a receiving coil that receives an induced current from the plurality of transmitting coils;
a plurality of shielding layers provided at lateral sides of each of the plurality of transmitting coils to fill a vertical space between non-overlapping portions of the coils;
a sensor to sense a position of the receiving coil relative to the plurality of transmitting coils; and,
a coil combination generator to generate a combination of transmitting coils among the plurality of transmitting coils based on a position sensed by the sensor.

17. The wireless power transmission system of claim 16, wherein an uppermost transmitting coil among the plurality of transmitting coils has a smaller inductance than the other transmitting coils of the plurality of transmitting coils.

18. The wireless power transmission system of claim 16, wherein the plurality of transmitting coils includes a first coil, a second coil provided on top of the first coil at a position that partially vertically overlaps with the first coil, a third coil provided on top of the second coil at a position that corresponds to and vertically overlaps with the second coil, and a fourth coil provided on top of the third coil at a position that corresponds to and vertically overlaps with the first coil and that partially vertically overlaps with the third coil.

19. The liquid dispenser of claim 13, wherein the shielding member includes a base shielding layer on which a lowermost layer among the plurality of layers is seated.

* * * * *